United States Patent Office 3,174,933
Patented Mar. 23, 1965

---

3,174,933
LUBRICANTS, METAL-WORKING AGENTS, AND HYDRAULIC LIQUIDS
Alfons Klein, Dusseldorf, and Hans Werner Kauczor, Cologne, Germany, assignors to Farbenfabriken Bayer Aktiengesellschaft, Leverkusen, Germany, a corporation of Germany
No Drawing. Filed Feb. 3, 1960, Ser. No. 6,377
Claims priority, application Germany, Feb. 18, 1959, F 27,734
5 Claims. (Cl. 252—47.5)

The present invention relates to the use as lubricants, metal-working agents and hydraulic liquids of hydroxyalkylated mercaptans. According to the invention there are used for this purpose the hydroxyalkylated mercaptans which are obtained by reacting 2-mercaptobenzthiazole or its substituted products with ethylene oxide, propylene oxide and/or epichlorhydrin in a molecular ratio of 1 to at least 5. These hydroxyalkylated 2-mercaptobenzthiazoles are applied as such or in the form of their solutions in water and/or hydrophilic organic compounds. The above compounds and method for their preparation are known in the art. Attention is called, for instance, to Gluesenkamp, U.S. Patent No. 2,498,617, filed July 2, 1947, and to Harle, U.S. Patent No. 2,721,177, filed March 30, 1953.

As substituted products of 2-mercaptobenzthiazole are mentioned for example 5-chloro-2-mercaptobenzthiazole, 6-nitro-2-mercaptobenzthiazole and 6-methoxy-2-mercaptobenzthiazole. Among the hydrophilic organic compounds to be considered as solvents there are to be understood in the first place those which contain hydroxyl groups, carbonamide groups, carbonyl groups or ether groups. Suitable representatives are for example ethylene glycol, diethylene glycol, triethylene glycol monoacetate, dimethyl formamide, methyl ethyl ketone, furthermore polyethers such as are obtainable for example by the polymerisation of 1,2- and/or 1,4-hydroxy compounds, by polycondensation of glycols or glycol mixtures, by conversion of glycols or glycol mixtures with aliphatic dihalogen compounds or by conversion of mono- or polyhydric alcohols with 1,2- and 1,4-hydroxy compounds.

The ratio between the hydroxyalkylated 2-mercaptobenzthiazoles and the solvents to be considered may vary within wide limits: in many cases a content of 0.5 percent by weight of the hydroxyalkylated 2-mercaptobenzthiazoles is sufficient. Suitable proportions can easily be ascertained as the case may be.

The hydroxyalkylated 2-mercaptobenzthiazoles as well as their solutions in water and/or hydrophilic organic compounds possess an excellent lubricating effect not only in the field of hydrodynamic lubrication but also in the field of maximum friction.

The hydroxyalkylated 2-mercaptobenzthiazoles in the form of their aqueous solutions can very successfully be applied in metal cutting because of their high efficacy in the field of maximum friction; they are transparent and do not lead to demixing so that the work pieces can satisfactorily be observed during treatment. The hydroxyalkylated 2-mercaptobenzthiazoles or their solutions in water and/or hydrophilic organic compounds can also be successfully applied in non-cutting metal-working. Thanks to their good compatibility with water they can easily be removed from the work pieces after treatment is completed. It is noteworthy that the hydroxyalkylated products do not give rise to cloudiness in hard water due to the formation of insoluble calcium compounds and that they can not only be used in a neutral but also in an acidic or alkaline medium.

If desired, the agents according to the present invention can also be admixed with defoaming agents, anticorrosives or with agents increasing the viscosity of the liquids.

It is already known to use as lubricants and the like hydroxyalkylated aliphatic mercaptans, for example hydroxyalkylated dodecylmercaptan. Compared therewith the products to be used according to the invention are distinguished by a surprisingly higher efficacy. This can be seen from the following table in which the maximum loads are indicated which result from comparative tests of the hydroxyalkylated mercaptans by the Almen-Wieland method (cf. Zerbe, Mineraloele und verwandte Produkte (1952), 907 to 908).

Table

| Content of the hydroxyalkylated product in aqueous solution in percent by weight | Maximum load in kg. when using— | |
|---|---|---|
| | The hydroxyalkylated product from 1 mol of 2-mercaptobenzthiazole and 20 mol of ethylene oxide | The hydroxyalkylated product from 1 mol of dodecylmercaptan and 18 mol of ethylene oxide |
| 0.0 | 250 | 250 |
| 0.5 | 300 | 250 |
| 1.0 | >2,000 | 250 |
| 2.0 | | 250 |
| 3.0 | | >2,000 |

We claim:
1. In a process in the metal working art, the improvement consisting in applying to an object being worked a solution consisting essentially of a major amount of water and an active lubricating amount of a compound having the formula

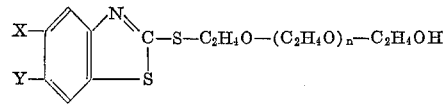

wherein X is a member selected from the group consisting of chloro and hydrogen and Y is a member selected from the group consisting of methoxy, nitro, chloro and hydrogen; when X is chloro, Y being defined as hydrogen, and when X is hydrogen, Y is defined as hydrogen, nitro, chloro and methoxy; and $n$ is an integer of 3–18.

2. In a process in the metal working art, the improvement comprising employing as a lubricant an aqueous solution containing a major amount of water and about .5%–3% by weight of a compound having the formula

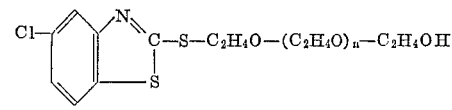

wherein $n$ is an integer of 3–18.

3. In a process in the metal working art, the improvement comprising employing as a lubricant an aqueous solution containing a major amount of water and about .5%–3% by weight of a compound having the formula

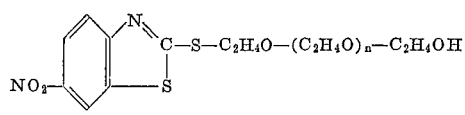

wherein $n$ is an integer of 3–18.

4. In a process in the metal working art, the improvement comprising employing as a lubricant an aqueous solution containing a major amount of water and about .5%–3% by weight of a compound having the formula

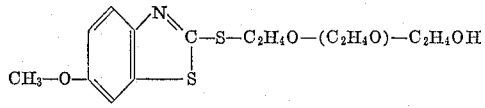

wherein $n$ is an integer of 3–18.

5. In a process in the metal working art, the improvement comprising employing as a lubricant an aqueous solution containing a major amount of water and about .5%–3% by weight of a compound having the formula

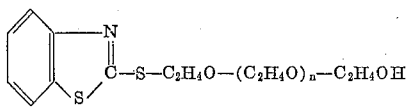

wherein $n$ is an integer of 3–18.

References Cited by the Examiner
UNITED STATES PATENTS

| | | | |
|---|---|---|---|
| 2,201,258 | 5/40 | Busse | 252—47.5 |
| 2,418,499 | 4/47 | Burke | 260—306 |
| 2,498,617 | 2/50 | Gluesenkamp | 260—306 |
| 2,625,509 | 1/53 | Laug | 252—49.5 |
| 2,721,177 | 10/55 | Harle | 252—47.5 |
| 2,985,590 | 5/61 | Morway et al. | 252—47.5 |

DANIEL E. WYMAN, *Primary Examiner.*

ALPHONSO D. SULLIVAN, JULIUS GREENWALD,
*Examiners.*